Patented Mar. 3, 1953

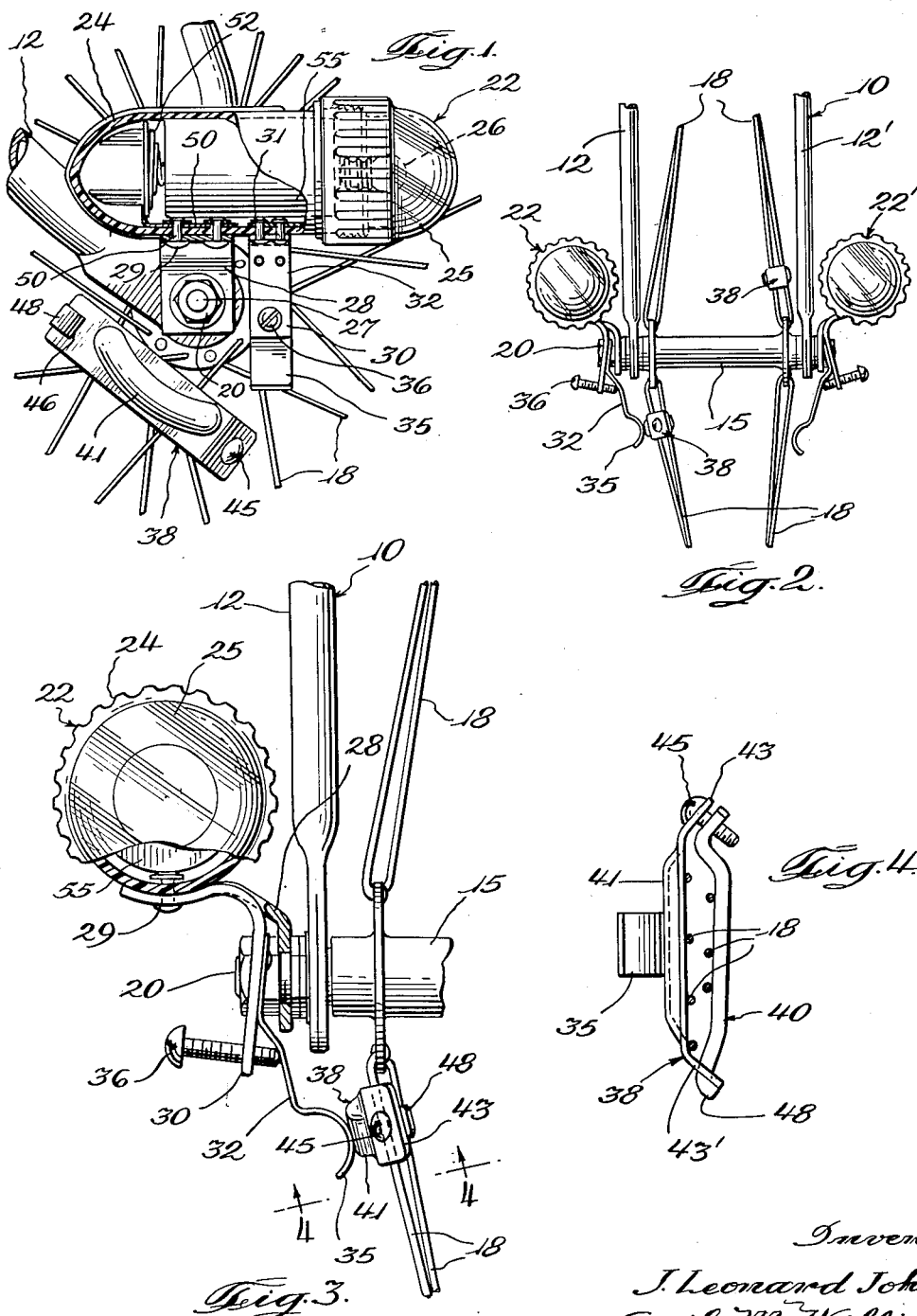

2,630,480

UNITED STATES PATENT OFFICE 2,630,480

SWITCH MECHANISM FOR WHEELED VEHICLES

J. Leonard Johnson and Cecil M. Williamson, Chicago, Ill., assignors to Sears, Roebuck and Co., Chicago, Ill., a corporation of New York Application May 6, 1948, Serial No. 25,408

4 Claims. (Cl. 177—339)

Our invention relates to electric signalling devices adapted to be mounted on vehicles and especially designed for use on bicycles; however, our invention is generally applicable to substantially any type of wheeled vehicle.

In its preferred embodiment, our invention contemplates an electric lamp which is so designed and mounted that it will normally function intermittently as a blinking signal, thus conserving electrical energy and also arresting attention more than if the light were shining constantly. Obviously, an intermittent sound signal would likewise be within the spirit of our invention.

In accordance with our invention, we have produced a compact, simple combination of parts comprising a housing for a light or other signal element and also enclosing a battery, one pole of which is grounded to the bicycle frame, a switch element carried by a wheel, being thus electrically connected to said ground; the other pole of the battery being connected to another switch element fixed on the bicycle frame in position to be intermittently contacted by a rotating element of the wheel in circuit with the aforesaid grounded switch element, so that, as the wheel rotates, the circuit will be closed intermittently, momentarily actuating the signal.

As another feature of our invention, we provide relative adjustability between the switch members, so that they may be arranged either to make contact or not to make contact, as desired. Thus, in the daytime, the elements may be so adjusted as to be out of contact, thus conserving electrical energy.

Our improved device is so designed as to comprise a minimum of simple, inexpensive parts which may be quickly attached to a bicycle or other vehicle by a mechanically unskilled person and which will have no exposed wires or rotating parts subject to deterioration.

Various other advantages will doubtless suggest themselves to those skilled in the art as the description proceeds.

Referring now to the drawings forming a part of this specification and illustrating a preferred embodiment of our invention;

Fig. 1 is a side elevation showing a lamp and parts associated therewith, mounted on a bicycle, the latter being shown fragmentarily;

Fig. 2 is an elevation taken on a plane perpendicular to that of Fig. 1 and illustrating a pair of lamps embodying our invention similarly mounted on a bicycle;

Fig. 3 is an enlarged elevational view of one lamp similar to Fig. 2 but in greater detail; and Fig. 4 is a sectional view taken substantially along the line 4—4 of Fig. 3.

The numeral 10 represents a fork of a bicycle, either front or rear, comprising the legs 12, 12', said legs journaling a hub or axle 15 of a wire wheel of which only the spokes 18 are shown fragmentarily.

The wheel is normally retained on the fork by nuts 20 and said nuts serve to mount and retain a lamp embodying our invention and indicated generally by the numeral 22. The lamp comprises a housing 24 of any suitable design, which in the instant case is of bullet shape, and terminates in a globe 25 for protecting the electric bulb 26 therewithin. The housing 24 contains a battery or batteries of the dry-cell type (not shown) for illuminating the lamp 26. (Obviously, a sound or other type of signal device might be substituted for lamp 26.) A bracket 28 which may be of strap metal or the like is secured as by rivets 29 to the housing 24, this bracket being of more or less rectangular formation and apertured to receive the threaded end 27 of a bearing for the axle 15.

Another bracket 30 is secured to the housing 24 as by rivets 31 or the like, this bracket being likewise of a generally rectangularly bent piece of strap metal or the like and carrying a switch element 32 of resilient sheet metal such as copper or other material. Said switch element is secured to the bracket 30 by rivets, soldering or other suitable means, the free end of said element being arcuately deformed as at 35 so as to extend toward the spokes 18. The bracket 30 has a threaded aperture near the end thereof receiving a screw 36, the end of which bears against the switch element 32.

The other switch element comprises a pair of plates 38 and 40 adapted to be secured to the spokes of the wheel. The plate 38 comprises an elongated member formed of sheet metal or the like and having an elongated outwardly embossed portion 41 which may, as best seen in Fig. 1 be of arcuate formation so as to increase its effective length. The ends 43, 43' of the member 38 are preferably bent at an obtuse angle out of the plane of the mid-portion thereof, the terminal portion 43 being apertured to receive a screw 45 while the opposite terminal portion 43' is slotted as at 46 to receive a hinge tongue 48 of the cooperating member 40. The opposite end of the member 40 has a threaded aperture to receive the screw 45.

Referring to Fig. 1, it will be seen that the bracket 28 is electrically connected through the rivets 29 to a conductor 50 inside the housing 24 which, in turn, contacts a metal spring 52 arranged in the base of the housing 24 and normally making electrical contact with the base of a battery, constituting one pole portion thereof. The other pole portion of the battery formed by the wall thereof will normally engage a contact member 55 inside housing 24 which is electrically connected, as by the rivets 31, to the bracket 30 and switch element 32.

The mounting of our improved lamp and associated parts is obviously simple and can be accomplished by a child or other mechanically unskilled person in a few moments. It is only necessary to remove the nut 20 from the bearing 27 of the wheel, applying the bracket 28 with the threaded end of said bearing extending through the aperture of said bracket and then replace the nut 20 so as to clamp the bracket and parts carried thereby securely to the frame. The battery within housing 24 will thus be grounded to the frame. The clip 38—40 is then secured to the spokes 18 in such position that it will pass opposite the arcuate portion 35 of switch member 32. Obviously, to mount this clip on the spokes, it is only necessary to unscrew the screw 45 from the member 40, then spread apart elements 38—40, the slot 46 and tongue portion 48 serving as a hinge, embracing a few of the spokes near the hub in the proper position adjacent switch element 35 and bringing the members 38—40 together again and securing them by means of the screw 45. It is then only necessary to adjust the switch member 32 by means of screw 36 until the arcuate portion 35 will make a firm wiping contact with the embossed portion 41 of the switch member 38.

Since the battery is grounded to the frame through clamp 28, rivets 29, contact member 50 and spring 52, whenever the switch element 38 is brought by revolution of the wheel into contact with the switch element 35, the electrical circuit will be closed and the lamp will be illuminated or other signal actuated.

Should it be desired to conserve the battery during the day, it will only be necessary to adjust the screw 36 to a point where the resilient switch element 35 will lie in a plane where it will not contact member 38.

We are aware that blinker lights for bicycles, etc., have previously been suggested as disclosed in U. S. patents to James, 2,283,442 (May 19, 1942), and Callan, 2,301,250 (November 10, 1942). However, we believe we are the first to have produced an improved structure as herein disclosed, having the advantages noted above. Complete absence of exposed wires and from moving parts renders our device especially rugged and efficient.

Various changes coming within the spirit of our invention may suggest themselves to those skilled in the art; hence, we do not wish to be limited to the specific form shown or uses mentioned, except as indicated in the appended claims.

We claim:

1. A switch member for attachment to a rotating part of a wheeled vehicle, comprising a pair of relatively narrow, elongated electrical conductors hingedly connected together at one end, and means for detachably securing said elements together opposite said hinge, whereby said switch member may be clamped to said rotating part, one of said conductors having an outwardly projecting boss extending for a substantial length parallel to the major plane of said conductor.

2. A switch member as defined in claim 1, wherein the parts are formed of a pair of elongated plates, the end portions of said plates being bent to form tongues, whereby, when the plates are brought together, the mid-portions of said plates will be spaced apart to form a clamp, said tongues of the respective plates being hingedly connected at one end and detachably connected at the opposite end, and one of said plates having an integral outwardly projecting elongated boss extending parallel to the major plane of the plate in the general direction of the major axis thereof.

3. A housing for a signalling device for a wheeled vehicle and battery for operating said device, a bracket on said housing formed of conducting material for securing said housing on and grounding same to a part of said vehicle, said bracket being electrically connected to one pole of said battery, and a second bracket on said housing carrying a resilient switch member of conducting material, said second bracket being electrically connected to the interior of said housing for completing the circuit with said battery, the two brackets being normally out of electrical circuit with each other except through a movable part of the vehicle on striking the second bracket.

4. A combination as defined in claim 3 having means carried by the second bracket and engageable with the switch member for varying the plane of the latter into and out of a position engageable with a rotating part of the vehicle.

J. LEONARD JOHNSON.
CECIL M. WILLIAMSON.

REFERENCES CITED

The following references are of record in the file of this patent:

UNITED STATES PATENTS

| Number | Name | Date |
| --- | --- | --- |
| 2,090,805 | Oliver | Aug. 24, 1932 |
| 2,222,075 | Johnston | Nov. 19, 1940 |
| 2,449,782 | Knitter | Sept. 21, 1948 |

FOREIGN PATENTS

| Number | Country | Date |
| --- | --- | --- |
| 371,208 | Germany | Mar. 12, 1923 |